United States Patent Office 2,904,173
Patented Sept. 15, 1959

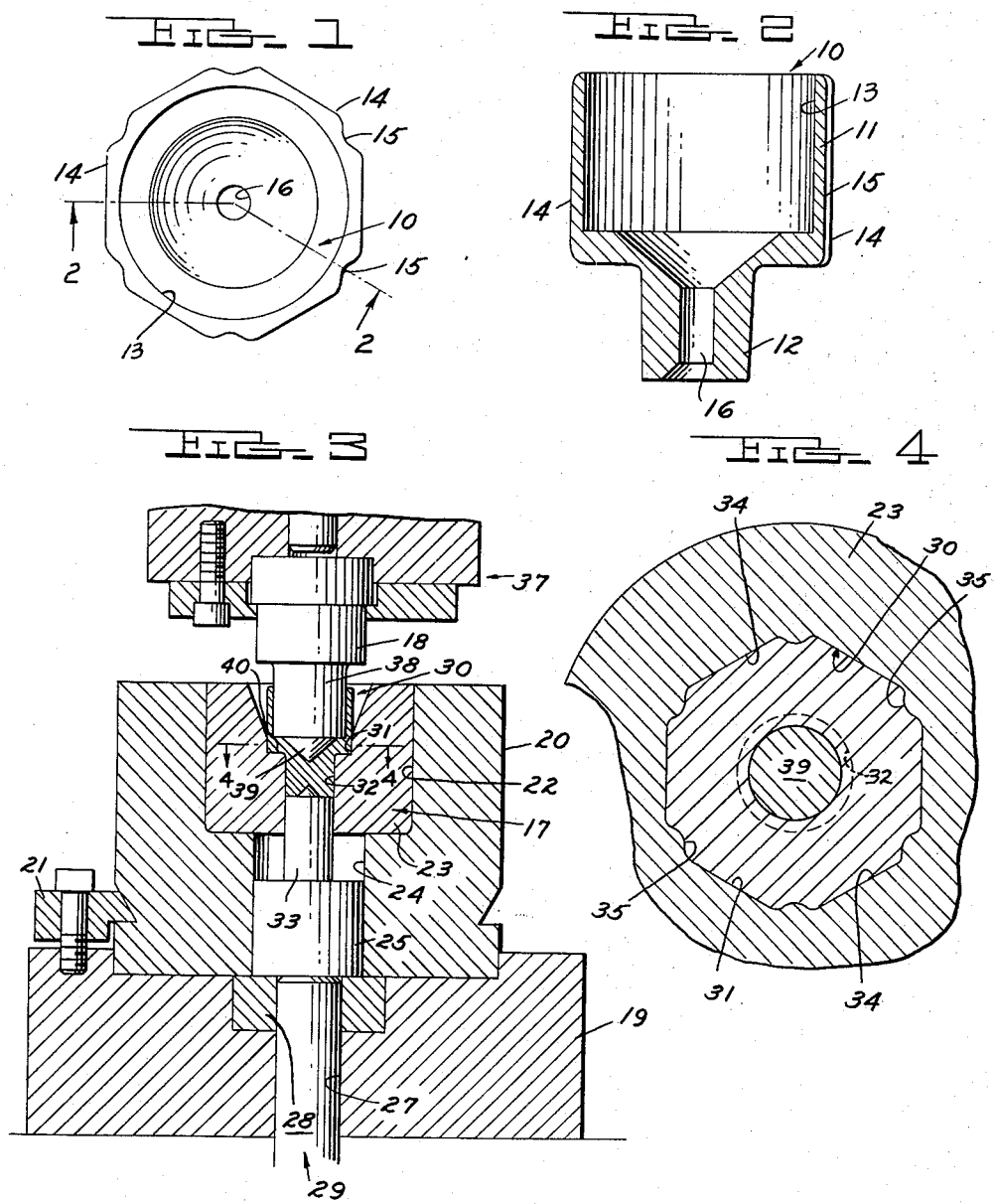

2,904,173

PLUNGER AND DIE FOR INDIRECT EXTRUSION

Frederick W. Braun, Dearborn, and Alfred Braun, Birmingham, Mich.

Application March 29, 1954, Serial No. 419,422

4 Claims. (Cl. 207—6)

This invention relates to tubular or hollow articles of the type having wrench engaging flats on the outer surface and to an improved method and apparatus for manufacturing such articles.

Articles of the general type to which the present invention pertains ordinarily have a hexagonal exterior contour for engagement by a suitable wrench and are usually made of steel by casting or machine operations. The cost of such articles may be substantially reduced by cold extruding a metal billet within a die cavity shaped to produce the articles. However, the cold extruding process noted above presents some problems and one of these problems is to overcome obtaining articles of irregular shape caused by non-uniform flow of the metal into the annular cavity surrounding the punch of the apparatus. For example, the width of the annular cavity for producing the article is necessarily greater at localities where the adjacent flat sides of the hexagon are joined so that during the extruding operation metal flows through the cavity at said localities at a greater rate than it flows through the remainder of the cavity. This uneven flow of metal results in an article having circumferentially spaced portions of uneven length and in some instances may cause the metal to fracture.

With the above in view it is an object of this invention to provide an article of the above type capable of being inexpensively produced by a cold extrusion process and, at the same time, materially reduce to a minimum the tendency for the metal to flow unevenly during the extruding operation. In accordance with this invention the article is formed with axially extending recesses between adjacent ends of the flat walls of the hexagonal outer surface of the article, and the die cavity has radially inwardly extending projections located to form such recesses. Thus, the width of the die cavity employed to form the hexagonally shaped wall of the article is substantially uniform throughout its annular extent and a more uniform flow of the metal results.

The foregoing as well as other objects will be made more apparent as this description proceeds especially when considered in connection with the accompanying drawing wherein:

Figure 1 is an end elevational view of one type of article embodying the features of this invention;

Figure 2 is a sectional view taken on the line 2—2 of Figure 1;

Figure 3 is a sectional semi-diagrammatic view of apparatus that may be used in producing the article shown in Figures 1 and 2; and Figure 4 is an enlarged sectional view taken on the line 4—4 of Figure 3.

The article selected for the purpose of illustrating this invention comprises a tubular housing 10 having an annular part 11 at one end and having a reduced annular part 12 at the opposite end. The annular part 11 has a cylindrical inner surface 13 and has an outer surface which is polygonally shaped to provide circumferentially spaced flats for engagement by a suitable wrench, not shown herein.

In the present instance, the outer surface is shaped to provide a hexagon having flats 14 and having recesses 15 extending axially of the part 11 between adjacent ends of the flats 14. The reduced part 12 is formed integrally with the part 11 in coaxial relationship to the latter and has a bore 16 therethrough.

One type of apparatus that may be used to produce the article or housing 10 is shown in Figures 3 and 4 of the drawing. This apparatus comprises essentially a die 17 and a punch 18. The die 17 has a base plate 19 and has a supporting plate 20 secured to the top of the base plate 19 by suitable clamps 21. The supporting plate 20 has an upwardly opening recess 22 for receiving a die block 23 and is formed with a bore 24 which extends downwardly from the base of the recess 22 through the remainder of said supporting plate 20. An ejector plunger 25 is slidably supported within the bore 24 and is seated on the top of the base plate 19 in registration with a bore 27 extending through the base plate 19. The bore 27 which is smaller in diameter than the bore 24 extends through a hardened insert 28 and slidably receives an actuator 29 for the ejector plunger 25.

The die block 23 has a cavity 30 comprising a portion 31 which serves as a matrix for the exterior surface of the housing 10 and a bore portion 32 which acts as a matrix for the part 12 of the housing 10. The portion 32 is in the form of a reduced bore which extends downwardly from the bottom of the portion 30 through the block 23 in registration with the bore 24 for receiving the reduced upper end 33 of the ejector plunger 25. As shown in Figure 4 of the drawing the portion 31 has a side wall which is formed with a series of flats 34 corresponding to the flats 14 on the outer surface of the annular part 11 of the housing 10, and has projections 35 extending radially inwardly from the side wall between adjacent ends of the flats 34. The projections 35 are of a size to produce the recesses 15 shown in Figure 1 of the drawing as respectively located between the flats 14 on the housing 10.

The punch 18 is supported above the die 17 in alignment with the die cavity 30 and is actuated by a head structure 37 of any suitable design. The punch 18 has a cylindrical part 38 at the lower end of a diameter corresponding to the inside diameter of the housing part 11 and has a portion 39 at the bottom which tapers to a point. The portion 39 is in vertical alignment with the reduced portion 33 of the ejector plunger 25 and, if desired, the upper end of the reduced portion 33 may also be tapered to a point.

In practice, a billet of cold metal is deposited in the cavity 30 and the punch 18 is lowered into the cavity 30. As the punch 18 approaches its lowermost position in the cavity 30 the metal is forced downwardly into the bore 32 to form the reduced part 12 of the housing 10 and, at the same time is extruded upwardly into the annular space 40 provided between the outer cylindrical surface of the part 38 on the plunger 18 and the adjacent wall of the portion 31 of the die cavity 30 to form the annular part 11 of the housing 10. Due to the fact that the projections 35 extend radially inwardly from the side wall of the cavity part 31 into the annular space 40, the width of the space 40 is substantially uniform throughout its circumferential extent, notwithstanding the flats 34 on the side wall of the cavity part 31. Thus, the flow of metal upwardly through the annular space 40 is practically uniform throughout the circumferential extent of the space 40 and irregularities in the length of the housing part 31 at the juncture of the flats 14 are reduced to a minimum.

Upon completion of the extruding operation the plunger 18 is withdrawn from the die cavity 30 and the article is ejected from the cavity by the plunger 25. The reduced portion 12 of the housing may then be drilled or otherwise formed to provide the same with the bore 16.

What we claim as our invention is:

1. In apparatus for extruding hollow articles having wrench flats on the outer surface extending circumferentially of the article, a die comprising a cavity having an inner surface portion provided with work forming flats corresponding to the flats on the article, the bottom of said cavity being closed during extrusion, a plunger axially movable into the cavity and having an external cylindrical surface cooperating with the inner wall of the cavity to provide an annular space, and ribs extending axially of the annular space at the juncture of adjacent ends of the flats on the inner surface of the die cavity and projecting into the annular space to reduce the width of the annular space at the juncture of adjacent ends of said work forming cavity flats, and thereby cause substantially uniform work material flow as said material is indirectly extruded through said annular space.

2. In apparatus for extruding hollow articles having inner and outer surfaces one being provided with wrench flats, a die having a cavity with an inner surface, the bottom of said cavity being closed during extrusion, a punch movable axially into said cavity having an outer surface cooperating with said inner surface of said die to provide an annular space, one of said inner and outer surfaces being provided with flats corresponding to the flats on the article to be extruded thereby causing said annular space to vary in cross sectional width throughout its circumferential extent, and surfaces projecting inwardly toward the coincident die and punch axes and connecting adjacent ends of the work forming cavity flats to reduce the variation in width of said annular space at the juncture of said flats, and thereby cause substantially uniform work material flow as said material is indirectly extruded through said annular space, said connecting surfaces extending axially of said annular space.

3. The construction as in claim 2 in which the one surface provided with flats is polygonal and the cooperating other surface of said inner and outer surfaces of said punch and die respectively is circular and said connecting surfaces are fashioned in cross section as re-entrant curves.

4. In apparatus for extruding hollow articles having flats forming an outer surface polygonal in cross section and having an inner surface circular in cross section, a die having a cavity having an inner polygonal surface with flats corresponding to the flats on the article to be extruded, the bottom of said cavity being closed during extrusion, a punch movable axially into said cavity with the outer surface of said punch circular in cross section thereby forming between punch and cavity surfaces an annular space varying in cross sectional width throughout its circumferential extent, and radially extending projections connecting adjacent ends of said flats on said inner polygonal surface of said die to reduce the variation in width of said annular space at the juncture of said flats, and thereby cause substantially uniform work material flow as said material is indirectly extruded through said annular space, said projections extending axially of said annular space.

References Cited in the file of this patent

UNITED STATES PATENTS

| | | |
|---|---|---|
| 796,223 | Kaub | Aug. 1, 1905 |
| 1,403,460 | Talty | Jan. 10, 1922 |
| 1,642,736 | Lyman | Sept. 20, 1927 |
| 1,722,634 | Kinkead | July 30, 1929 |
| 1,819,254 | Mantle | Aug. 18, 1931 |
| 2,162,776 | Friden | June 20, 1939 |
| 2,203,376 | Witte | June 4, 1940 |
| 2,266,189 | Ganoe | Dec. 16, 1941 |
| 2,341,749 | Webb | Feb. 15, 1944 |
| 2,602,988 | Klym | July 15, 1952 |
| 2,810,478 | Sejournet et al. | Oct. 22, 1957 |

FOREIGN PATENTS

| | | |
|---|---|---|
| 731,321 | Great Britain | June 8, 1955 |